No. 835,043. PATENTED NOV. 6, 1906.
W. W. STEWART.
HAY PRESS.
APPLICATION FILED JAN. 3, 1906.

2 SHEETS—SHEET 1.

WITNESSES:
E. F. Stewart
C. N. Woodward.

Warren W. Stewart,
INVENTOR.
By C. A. Snow & Co.
ATTORNEYS.

No. 835,043. PATENTED NOV. 6, 1906.
W. W. STEWART.
HAY PRESS.
APPLICATION FILED JAN. 3, 1906.
2 SHEETS—SHEET 2.
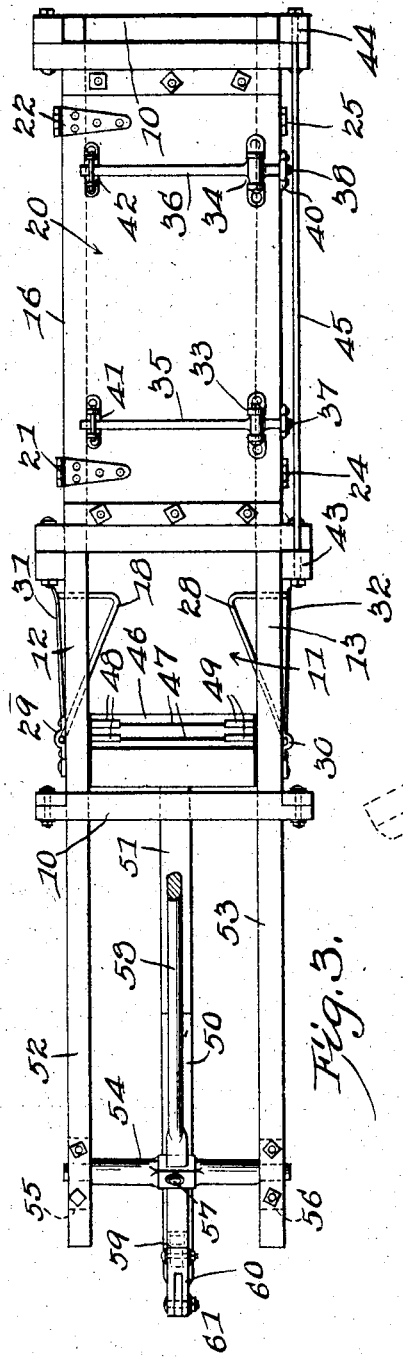
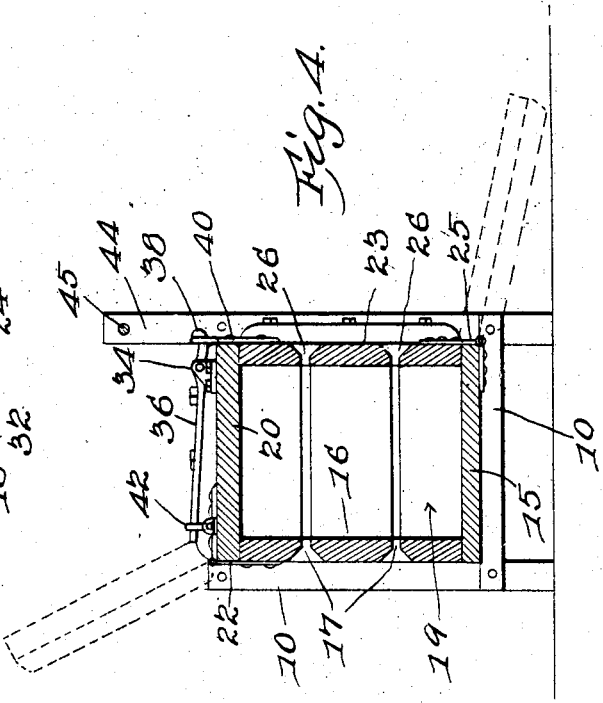
WITNESSES:
E. F. Stewart
C. N. Woodward.
Warren W. Stewart,
INVENTOR.
By C. A. Snow & Co
ATTORNEYS

UNITED STATES PATENT OFFICE.

WARREN WALTER STEWART, OF MASON, TEXAS.

HAY-PRESS.

No. 835,043.     Specification of Letters Patent.     Patented Nov. 6, 1906.

Application filed January 3, 1906. Serial No. 294,415.

*To all whom it may concern:*

Be it known that I, WARREN WALTER STEWART, a citizen of the United States, residing at Mason, in the county of Mason and State of Texas, have invented a new and useful Hay-Press, of which the following is a specification.

This invention relates to baling-presses, more particularly to presses for baling hay and like products, and has for its object to improve the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportions, and minor details of construction may be resorted to without departing from the principle or sacrificing any of the advantages of this invention within the scope of the appended claims.

Figure 1:
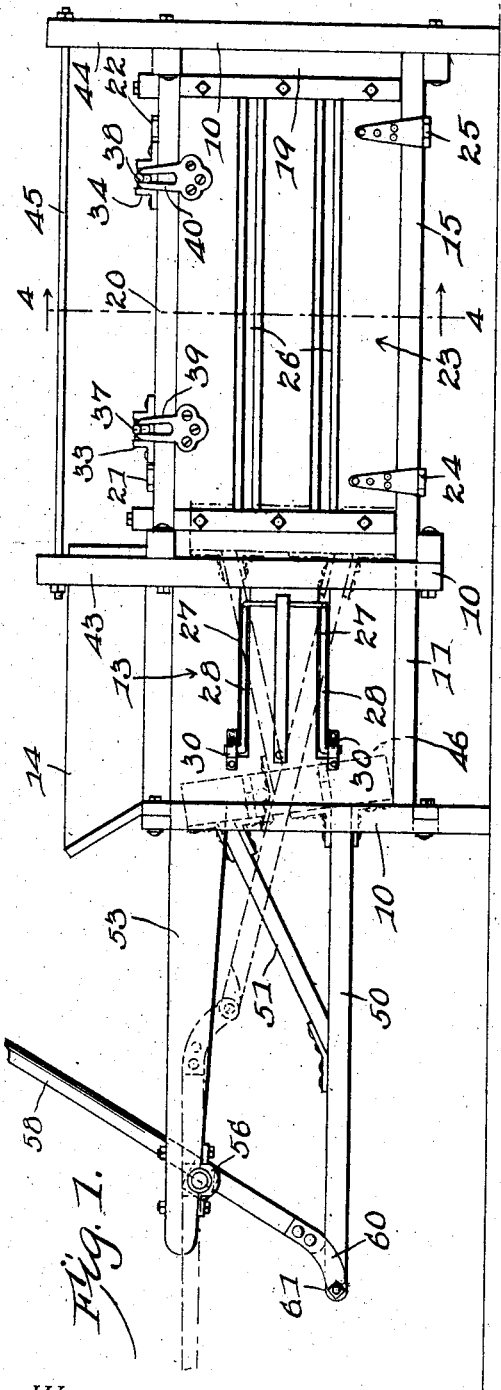
Figure 2:
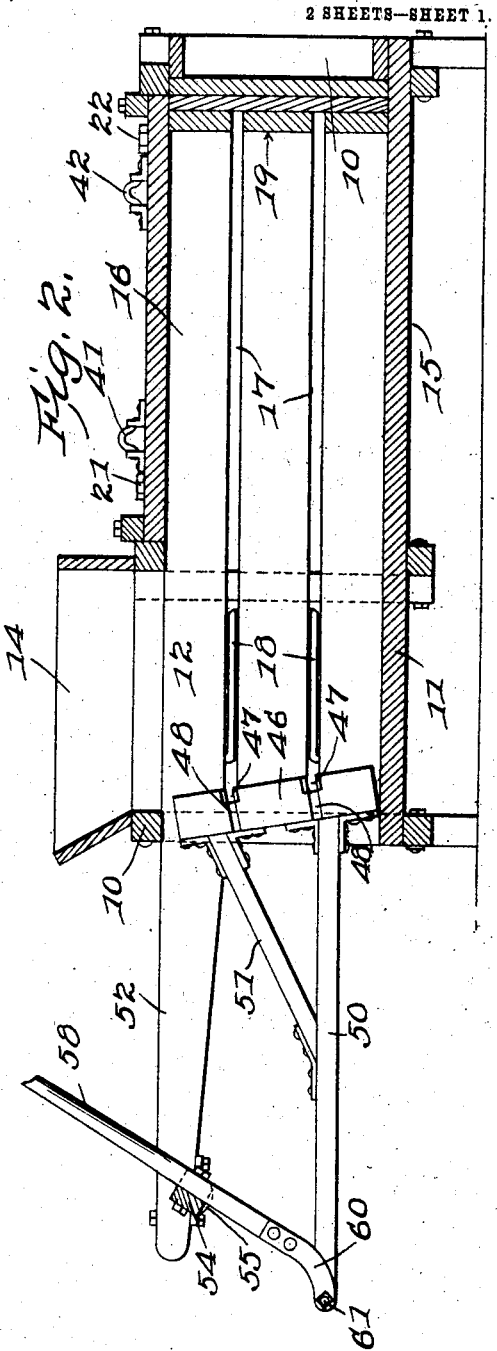

In the drawings, Figure 1 is a side elevation. Fig. 2 is a longitudinal sectional elevation. Fig. 3 is a plan view. Fig. 4 is a transverse section on the line 4 4 of Fig. 1.

The improved devices may be applied to any of the various sizes of presses or to devices of this class employed for baling any of the various commodities or products thus treated, but is more particularly designed for use upon manually-operated hay-presses and the like, and for the purpose of illustration is shown thus applied, the improved structure comprising in general a feed box or receptacle, a plunger operating through the feed-box, a lever for operating the plunger and arranged to cause the plunger to move through the feed-box, with the lower end in advance and gradually moved into vertical position, a baling-box extending from the feed-box, and means for discharging the completed bale from the baling-box.

The improved structure is formed with a supporting-frame 10, having at one end a feed box or receptacle consisting of a closed bottom 11 and sides 12 13 and with an open top and also open at the ends, a feed-hopper 14 being arranged above the feed-box.

Extending from the feed-box is the baling-box formed with closed bottom 15 and one closed side 16, continuing the closed bottom 11 and side 12 of the feed-box, the two bottom portions 11 and 15 being preferably formed from continuous planks and the side portion 12 and 16 being likewise preferably formed from continuous planks, the latter plank members being spaced apart, as shown at 17, to permit the passage of the binding-wires in the baling-box portion and the gavel-holding pawls 18 in the feed-box portion.

The baling-box portion is closed at the outer end, as at 19, and with the top 20 hinged at 21 22 to the upper edge of the side 16 and the side 23 of the baling-box hinged at 24 25 to the bottom 15 of the same. The side 23 of the baling-box is formed with longitudinal slots 26, corresponding to the spaces 17 in the side 16, and the side 13 of the feed-box is also formed with slots 27 to receive the stop-pawls 28, corresponding to the stop-pawls 18 of the side 12, the slots 26 coacting with the slots 17 to permit the binding-wires to be applied to the bales in the usual manner. The pawls 18 and 27 are alike and each formed from a single piece of resilient wire of sufficient strength to withstand the strains to which they are subjected, and consist of spaced side portions bent vertically at the ends and connected to the sides 12 and 13, respectively, by clips 29 and 30, and held yieldably in projected position through the slots 17 and 27 by springs 31 32. Pivoted at 33 34 upon the top 20 of the baling-box are levers 35 36, the shorter ends terminating in hooks 37 38, engaging loops 39 40, attached to the side 23 of the baling-box, while the longer portions of the levers are detachably supported by swinging catches 41 42. By this means the swinging top 20 and side 23 are firmly locked together during the baling operations, and when the bale is completed it can be readily released by simply detaching the catches 41 42 and permitting the longer ends of the levers to be elevated and the shorter hooked ends to be depressed and released from the loops 39 and 40. The top 20 can then be folded back and the side 23 folded down, as represented by dotted lines in Fig. 4, leaving the baling-box open for the removal of the bale laterally therefrom.

The frame members at the ends of the baling-box at the side having the swinging portion 23 are extended upwardly, as at 43 44, and connected by a tie-rod 45, so that the side having the swinging portion will be as strong to resist the pressure exerted by the baling action as the other parts of the device.

The plunger portion of the device is represented at 46 and provided with spaced channels 47 to receive the binding-wires and with recesses 48 49 to pass over the pawls 18 28 at the return stroke. Extending rearwardly of the plunger is an operating-beam 50 and supported rigidly in position relative to the beam by a brace 51. The beam 50 is disposed at an angle to the plunger, as shown. The upper member of the side 12 of the baling-box is extended rearwardly of the feed-box, as at 52, and the upper member of the side 13 of the baling-box is likewise extended rearwardly of the feed-box, as at 53, the extended portions having a cross-beam 54 mounted for rotation thereon by bearings 55 56. Rigidly connected at 57 to the cross-beam is a lever 58, having curved straps 59 60, coupling the shorter end to the rear end of the beam 50 at 61. By this means when the plunger is in withdrawn position, as shown in full lines in Fig. 2, the operative face stands at an incline to the vertical at the rear end of the feed-box, thus leaving the box entirely free to receive the gavel or feed of hay, the lever 58 when the plunger is in withdrawn position standing in a forwardly-inclined position, as in full lines in Figs. 1 and 2.

When the feed has been supplied to the feed-box, the lever 58 is drawn rearwardly to cause the plunger to move forwardly through the feed-box and force the material into the baling-box, the plunger being carried through the greater portion of its stroke in an inclined position with the lower edge in advance of the upper edge, but as the movement continues the pivoted end 61 of the lever rises and carries the beam 51 with it, and thus gradually moves the plunger into a vertical position, as represented in dotted lines in Fig. 2.

The relative positions of the oscillating beam 54 and the operating or plunger beam 51 produce a "toggle-lever" action at the last portion of the stroke at the same time that the plunger is brought into its vertical position at the end of its stroke, thus imparting a very powerful pressure upon the gavel where most required.

In placing the material in the feed-box the lower portion is necessarily more closely packed by the implements employed for introducing it therein, leaving the upper portion more loose and open, and the upper portion of the plunger traveling through a greater distance than the lower portion during the stroke the pressure is equalized and all portions of the gavel or feed compressed to a uniform degree.

The device is simple in construction, can be inexpensively manufactured, and operates effectually for the purposes described.

Having thus described the invention, what is claimed is—

1. In an apparatus of the class described, a feed-box open at the top and ends and with one side and the bottom extended to form one side and the bottom of a baling-box, said baling-box closed at the outer end, a plunger operating through said feed-box, a top to said baling-box hinged to said extended side, a closure to the other side of said baling-box and hinged to the bottom of the same, and fastening means applied to the free edges of the hinged members.

2. In an apparatus of the class described, a supporting-frame, a feed-box carried by said frame and open at the top and ends and with the bottom and one side extended to form the bottom and one side of a baling-box, said baling-box closed at the outer end, vertical frame members extended above the ends of the open side of the baling-box, a tie-rod connecting the extended portions of said frame, a top to said baling-box hinged to said extended side, a closure to the open side of said baling-box and hinged to the extended bottom thereof, means for detachably connecting the free edges of said hinged cover and side, and a plunger operating through the feed-box.

In testimony that I claim the foregoing as my own I have hereto affixed my signature in the presence of two witnesses.

WARREN WALTER STEWART.

Witnesses:
JIM LEMBURG,
DEE GIBBS.